United States Patent [19]

Hoffman

[11] 4,303,340

[45] Dec. 1, 1981

[54] OPTICAL MICROMETER MEASURING SYSTEM

[76] Inventor: Robert Hoffman, 17 Copper Beech Pl., Merrick, N.Y. 11566

[21] Appl. No.: 52,320

[22] Filed: Jun. 26, 1979

[51] Int. Cl.³ .............................................. G02B 27/32
[52] U.S. Cl. ...................................... 356/372; 350/10; 356/252
[58] Field of Search ................ 350/10, 110, 112, 113; 356/251, 252, 372, 399; 33/297, 298

[56] References Cited

U.S. PATENT DOCUMENTS

| | | | |
|---|---|---|---|
| 3,499,715 | 3/1970 | Hansen et al. | 350/10 |
| 3,582,178 | 6/1971 | Boughton et al. | 350/10 |
| 4,008,946 | 2/1977 | Tsuda et al. | 350/10 |
| 4,027,942 | 6/1977 | Fukushige | 350/10 |

FOREIGN PATENT DOCUMENTS 702024  1/1941  Fed. Rep. of Germany ...... 356/247

Primary Examiner—R. A. Rosenberger
Attorney, Agent, or Firm—Michael Ebert

[57] ABSTRACT

An optical micrometer measuring system adapted to gauge minute distances between spaced points on an object under test and to indicate the results in digital terms. The system includes a compound microscope having a stage for supporting the object, the object being illuminated and being focused by an objective onto a real image plane to produce an aerial object image which is viewable in magnified form by an operator through an eyepiece. Associated with the microscope is a projector which creates an illuminated image of a pointer, optical means being provided to superimpose the pointer image over the aerial object image. Operatively coupled to the projector is a micrometer controllable by the operator to translate the pointer image between any two points of interest on the object image. The distance travelled by the pointer image is digitally indicated by an analog-to-digital read-out coupled to the micrometer to provide the desired reading.

14 Claims, 12 Drawing Figures

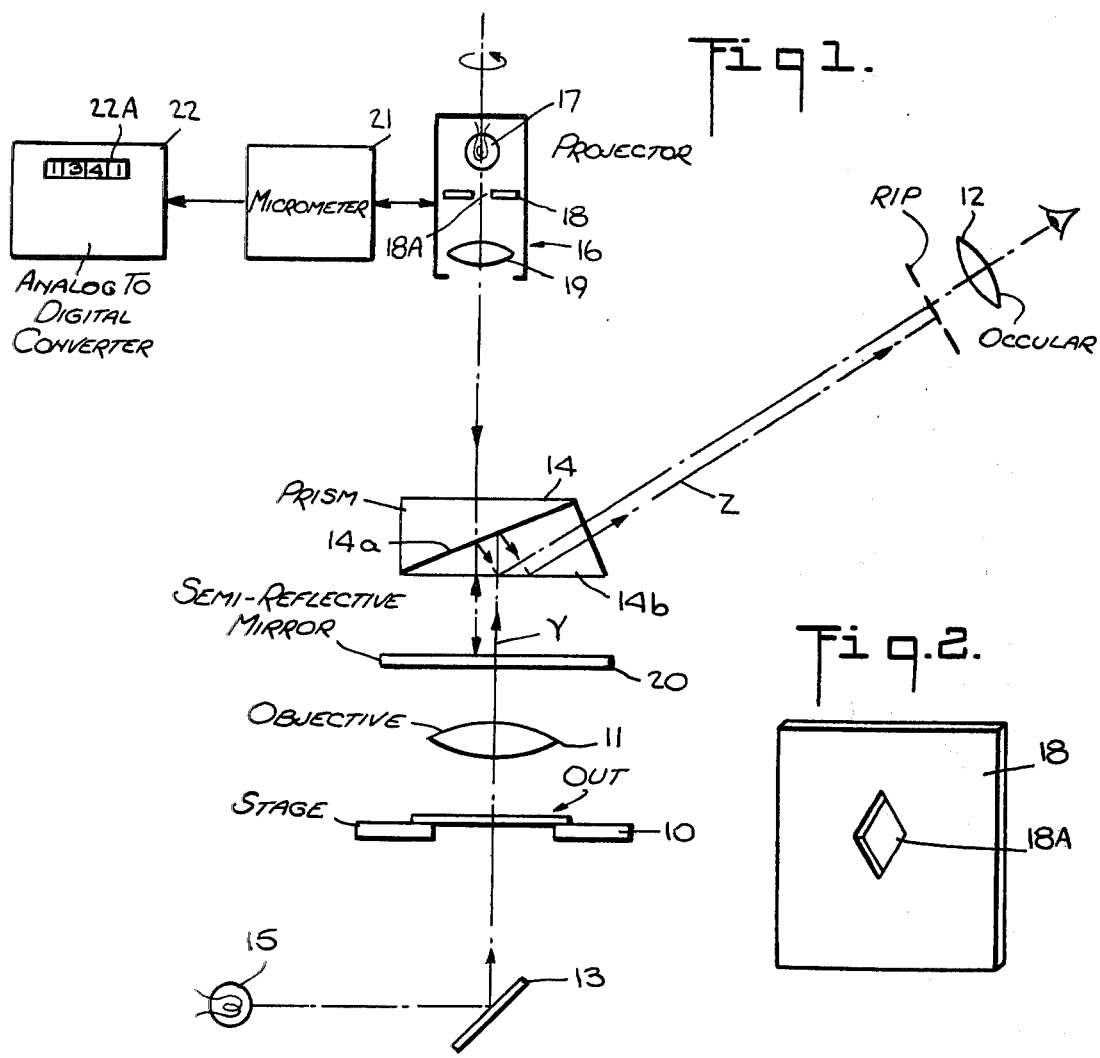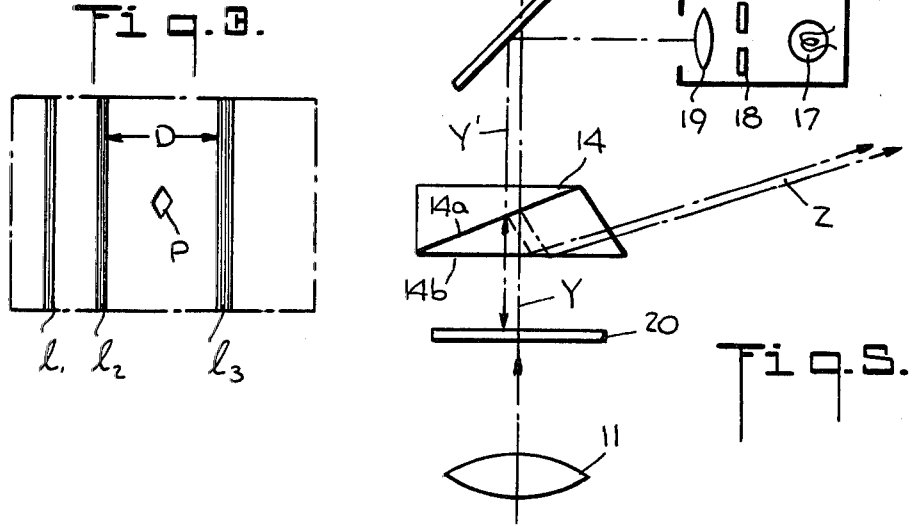

INTENSITY OF EDGE IMAGE

MICROMETER MOTION

OPTICAL MICROMETER MEASURING SYSTEM

BACKGROUND OF INVENTION

1. Field of Invention

This invention relates generally to optical micrometer systems for precisely measuring minute distances between spaced points on an object being tested, and more particularly to a system of this type which produces an illuminated aerial image of the object and optically superimposes thereon an illuminated image of a pointer whose position is shiftable by an operator to determine the distance travelled by the pointer image in going from one point to another on the object image.

2. Prior Art

Though the invention is applicable to the measurement of minute distances between any two points or lines on an object such as a biological specimen or a precision-machined part, it has particular value in conjunction with microelectronic or integrated circuit devices in which the passive and active electrical components of a circuit such as solid-state diodes or transistors are created on a silicon substrate, the components being interconnected by a pattern of conductive lines formed on the substrate.

In test procedures related to the production of such microelectronic devices, one must measure the width of the various conductive lines which are included in the line pattern as well as the spacing between lines. In this rapidly evolving field, in order to reduce the cost and dimensions of such devices, the direction is toward a greater density of components on a given substrate, this being accompanied by a compression of the conductive line pattern. As a consequence, the conductive line formations are thinner, with closer spacings therebetween.

Since it is vital that line widths and spacings in integrated circuits conform with design specifications, the formation of finer lines and closer line spacings has further narrowed the acceptable margin of error in measurement techniques for determining whether the line pattern is in compliance with the specifications therefor.

It is known to use optical micrometers to carry out measurements on integrated circuits. Two types of optical micrometers are currently in widespread use. One is the so-called filar micrometer, such as the Digital Filar Micrometer Eyepiece manufactured by E. Leitz, Inc. of Rockleigh, N.J., and the other being the image-shearing micrometer, such as the Image-Shearing Measuring and Direct Dimensional Read-Out System manufactured by Vickers Instrument, Inc. of Malden, Mass.

In a filar micrometer, a cross hair of filar is physically placed at the real image plane of a compound optical microscope and both are imaged on the retina of the eye. The motion-producing mechanism for the filar is operatively coupled to a digital electronic micrometer for measurement of line width or line spacing on the object image.

Because the operator, via his eye, must determine the placement of the filar, this requirement often gives rise to erroneous readings. In practice this type of measurement is subject to a fairly high order of human subjectivity. No two operators possess the same degree of visual acuity, and operator fatigue and the optophysiological requirements for repeatability are such as to render the filar micrometer a relatively imprecise measuring instrument.

A further problem with a filar micrometer is that there is generally insufficient access to the real image plane for the filar and the associated micrometer mechanism. The physical presence of the filar and micrometer mechanism in the image plane renders standard binocular vision inconvenient.

In the image-shearing optical micrometer, a beam-splitter acts to divide the imaging light beam into two parts and to create two identical images of the object under test. These images are shifted or sheared with respect to each other by an amount controlled by a micrometer. The degree of shear is directly proportional to rotation of the micrometer drum and can be read from a digital read-out associated therewith.

When the shear is zero, the illuminated double images of the object are exactly superimposed and are seen through the eyepiece as a single, relatively dark image against a bright field. If the shear is such that the two images overlap, then the amount of shear is less than the object dimension, this being indicated by the fact that the overlapping zone is as dark as superimposed images, whereas the non-overlapping areas of the two images are less dark. When, however, the two images just touch each other, each image is less dark than in the case of superimposed images, and the amount of shear is exactly equal to the object dimension. Thus when the object being tested is a photo-mask of a conductive line pattern of an integrated circuit, the condutive lines in one image will be contiguous with the corresponding conductive lines in the other image only when the amount of shear is exactly equal to the line thickness.

Since the precision of the image-shearing measurement technique depends on finding the point at which the images just touch—and this is indicated to the operator in terms of light intensity—in practice the subjectivity of the typical operator makes it difficult to discern this exact point. Also, due to the doubling of every image point, this leads to confusion and fatigue.

The following prior art patents are of interest in connection with the present invention: Boughton, U.S. Pat. Nos. 3,582,178; Vanden Brack et al., 4,099,881; McGivern, 3,398,631 and Fassin, 1,974,606.

SUMMARY OF INVENTION

In view of the foregoing, the primary object of this invention is to provide an optical micrometer measuring system for precisely gauging minute distances between spaced points on an object under test, the system minimizing the ambiguities heretofore encountered in filar and image-shearing optical micrometers and affording improved repeatability and reduced operator fatigue.

In the context of the present invention, point-to-point measurement of lines in integrated circuit conductive line patterns includes not only the spacing between adjacent lines but also linewidth measurement in which the width of a line is determined by measuring the distance between opposing edges thereon.

More particularly, it is an object of this invention to provide an optical micrometer measuring system in which the distance between any two points of interest on an object is determined by optically creating an illuminated aerial image of the object and superimposing thereon an illuminated image of a pointer which is laterally shiftable under the control of an operator between the two points, the distance travelled by the pointer image being indicated to afford the desired reading.

A salient feature of a system in accordance with the invention is that the illuminated aerial image of the object is not filtered or blocked by the measuring pointer but is viewable by the operator through the superimposed illuminated pointer image; hence only a small portion of the object image field has an appearance which differs from the normal field.

Also an object of the invention is to provide a system of the above-type in which the intensity and quality of illumination for the object image and that for the pointer image are independently controllable whereby the contrast between object and pointer may be heightened to facilitate viewing. By switching off the pointer illumination, one effectively removes the measuring system from view.

Yet another object of the invention is to provide a reliable, efficient and accurate optical micrometer point-to-point measuring system which entails relatively simple modifications in a standard compound microscope without changing the length of the optical path whereby the system may be manufactured at relatively low cost.

Briefly stated, these objects are attained in a system which includes a compound microscope having a stage for supporting the object under test, the object being irradiated by an object light source and being focused by an objective onto a real image plane to produce an aerial image of the object which is viewable in magnified form by an operator through an ocular.

Associated with the microscope is a projector which includes a separately controllable projector light source and creates an illuminated image of a pointer defined by an apertured mask, optical means being provided to superimpose the pointer image over the aerial object image. Operatively coupled to the projector mask is a mechanical micrometer controllable by an operator to translate the pointer image between any two points of interest on the object image, the distance travelled by the pointer image being digitally indicated by an analog-to-digital readout coupled to the micrometer to provide the desired reading.

In a preferred embodiment of the invention, a beam from the object light source is directed upwardly through a transparent object on the stage and through the objective thereabove onto the interface of a beam-splitting prism, a semireflective mirror which is permeable to the beam being interposed between the objective and the prism. The interface of the prism reflects a portion of the object-modulated light beam toward an ocular along a main optical path, the remaining portion of the beam being undeflected.

A beam from the projector light source passing through the pointer mask and a projector lens is directed downwardly toward the prism which is permeable to the beam, the pointer-modulated beam impinging on the semi-reflective mirror therebelow. The mirror is positioned to reflect the beam upwardly toward the prism interface, from which it is reflected toward the ocular along the main path to create an illuminated pointer image which is superimposed on the real image plane over the object image.

OUTLINE OF DRAWINGS

For a better understanding of the invention as well as other objects and further features thereof, reference is made to the following detailed description to be read in conjunction with the accompanying drawings, wherein:

FIG. 1 is a schematic diagram of one preferred embodiment of an optical micrometer system in accordance with the invention;

FIG. 2 separately illustrates the apertured mask included in the projector;

FIG. 3 shows a portion of the object image seen through the eyepiece of the microscope included in the system and the pointer image superimposed thereon;

Figure 6A:
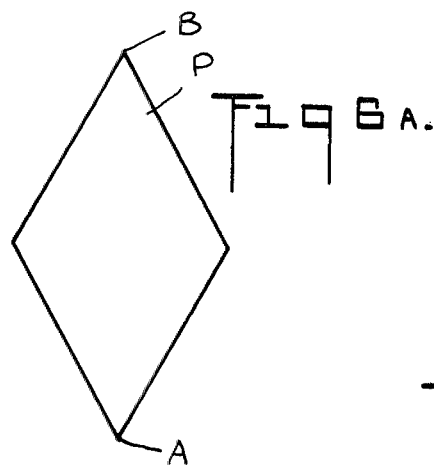
Figure 6B:
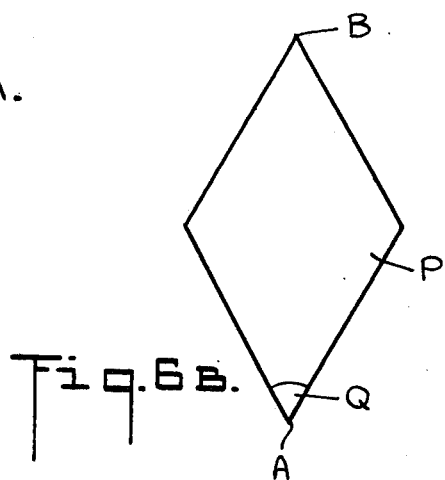
Figure 6C:
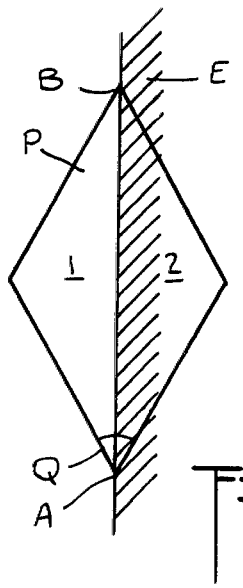
Figure 6D:
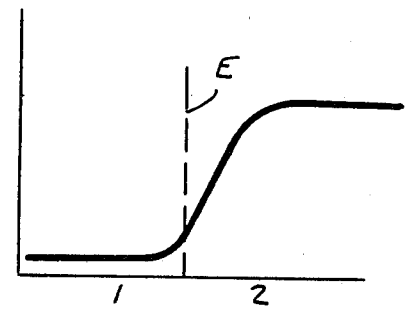
Figures 7A, 7B:
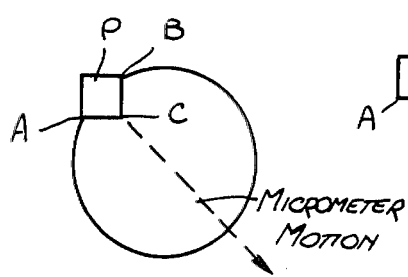
Figure 7C:
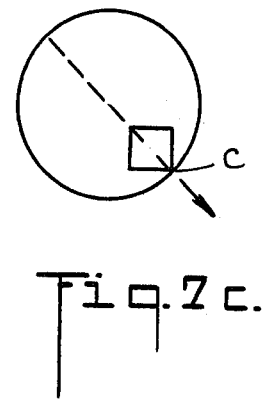

FIG. 5 schematically shows a second embodiment of an optical micrometer system in accordance with the invention;

FIGS. 6A, 6B, 6C and 6D illustrate how the pointer geometry makes possible precise location of a point of interest on a straight edge; and FIGS. 7A, 7B and 7C illustrate how the pointer geometry makes possible precise location of a point of interest in a circle.

DESCRIPTION OF INVENTION

First Embodiment

Referring now to FIG. 1, there is shown an optical micrometer system in accordance with the invention, the system including a compound microscope having a stage 10 for supporting an object under test (OUT).

Since the system uses the principal components of any standard compound microscope, it includes an objective 11 which, though shown as a single lens, is actually a complex arrangement of lenses acting as a single convex lens of short focal length and large numerical aperture wherein aberrations are corrected. The second lens is the ocular or eyepiece 12 which is usually made up of two simple lenses also acting effectively as a single convex lens. As in a standard microscope, an inclined mirror 13 directs a beam of light derived from the object light source 15 through the object supported on the stage. An objective 11 positioned above the stage projects an enlarged image of the object onto a real image plane RIP to produce an aerial image of the object.

This aerial image is viewed by the operator through eyepiece 12 which magnifies the aerial image rather than the actual object. For purposes of explanation, we shall assume that the object under test is a film having an integrated circuit pattern thereon, which film is permeable to light. When, however, the object is opaque, it will be illuminated by light rays directed toward its surface and reflected therefrom.

The enlarged image formed by the eyepiece is known as the virtual image, because the light rays do not come from this image but merely appear to come from it. The final magnification is the product of the objective and eyepiece magnifications, the limit of useful magnification being set by the resolving power of the microscope which depends generally on the design of the objective. While a single eyepiece is shown, the microscope may be of the binocular type for convenient use by both eyes, in which event a prism is provided to divide the light rays passing up from the objective so that a portion of these rays go to one eyepiece and the remaining portion to the other.

Unlike the standard microscope having a viewing tube with the objective at the bottom and the eyepiece at the top, the rays from objective 11 are deflected by a beam-splitting prism 14 which diverts the rays from the objective which are projected upwardly along a vertical optical path Y toward the optical path Z leading to eyepiece 12, which path is inclined with respect to path Y. Optical path Z is designated as the main optical path.

Prism 14 includes an interface 14a that is inclined relative to optical path Y and is parallel to path Z, and a base 14b which is normal to path Y. Hence the rays from objective 11 are reflected by interface 14a toward base 14b and are directed by the base along main path Z to create an aerial image of the object in the real image plane RIP in advance of the eyepiece. This plane is sometimes referred to as an intermediate plane.

Associated with the microscope is a projector, generally designated by numeral 16, which creates an illuminated image of a pointer. Projector 16 is constituted by a projector light source 17, an apertured mask 18 and a projection lens 19. Mask 18, as shown separately in FIG. 2, is provided with a diamond-shaped aperture 18A, the light passing therethrough being projected by lens 19 downwardly along a vertical optical path Y' parallel to path Y.

The rays from projector 16 pass through beam splitter 14 and impinge on a semi-reflective mirror 20 which is interposed between prism 14 and objective 11. Mirror 20 is effectively permeable to the object-modulated rays projected upwardly therethrough by microscope objective 11 and therefore does not interfere with the operation of the microscope. However, the pointer-modulated rays projected downwardly by projector 16 through prism 14 impinge on the upper surface of mirror 20 and are partially reflected thereby, the mirror being positioned such that the reflected rays travel upwardly along path Y' to strike interface 14a of the prism. The interface functions to reflect the projector rays toward base 14b of the prism, which in turn directs the rays toward real image plane RIP along main optical path Z. In practice, one may use optical elements other than prisms to deflect the rays from the projector and object toward the main optical path.

Since the projector produces an image of mask aperture 18A, this image functions as an optical pointer. This pointer image is optically superimposed on the aerial object image. This is shown in FIG. 3, which illustrates a portion of a magnified conductive line pattern on the integrated circuit film which is the object under test, the circuit including three parallel lines $l_1$, $l_2$, $l_3$, having different line widths and spacings. Superimposed over this object image is that of the diamond-shaped pointer P whose position is laterally shiftable to traverse a distance between any two points of interest, such as the distance D between lines $l_2$ and $l_3$.

Projector 16 is supported for rotation on a suitable mount so that it may be rotated to assume any desired angular position (0° to 360°) normal to optical path Y', thereby orienting the pointer image P. The purpose of this adjustment is for alignment and for the elimination of cosine error.

Mask 18 of projector 16 is operatively coupled to the screw of a mechanical micrometer 21 which is adapted to laterally shift the mask and thereby translate the position of the pointer image P with respect to the aerial image of the object on which it is superimposed. Micrometer 21 is operatively coupled to a resettable analog-to-digital readout 22 which converts the micrometer movement to a digital display. This display may be constituted by light-emitting diode stations 22A to provide a numerical readout. Digital readouts suitable for this purpose are described in the Ledley U.S. Pat. No. 4,103,327 and the von Voros U.S. Pat. No. 4,035,922.

In operation, the pointer is first set on one point on the object image and the readout then reset to zero. Then the pointer is shifted by the micrometer until it sits on the second point, the digital reading, which may be given in micro-inches, then indicating the spacing between the two points.

In practice, the micrometer must be arranged to shift only the mask 18 or the mask in combination with the light source 17. The intensities of microscope light source 15 and projector light source 17 are separately controllable. The projector and/or the light source may include color filters to impart distinctive colors to the illuminated pointer and object images.

This light control feature in useful in obtaining greater contrast between the illuminated pointer and the illuminated object as seen by the operator through the eyepiece. The relative intensities of the pointer and object images depend not only on the intensities of the illumination sources therefor, but also on the light transmission (T) and reflectance (R) characteristics of prism 14 and semi-reflective mirror 20 as well as object absorptivity and reflectance.

Thus if prism 14 has an "R" characteristic of 20%, and a "T" characteristic of 80%, then a large percentage of the light energy from object source 15 will go toward projector 16 where it serves no useful purpose, but enough will go toward the main optical path Z to provide a well illuminated object image. On the other hand, if mirror 20 has an "R" characteristic of 80% and a "T" characteristic of 20%, then most of the light from projector source 17 will go toward the main optical path Z, and relatively little will be wasted by going toward the objective. In this way, it is possible to use standard microscope object illumination which is sufficient, even though much of the light is diverted from the main optical path, in conjunction with a relatively low-power projector illumination source, for more efficient use is made of the projector source in the optical arrangement shown in FIG. 1.

Actual Embodiment

Figure 4:
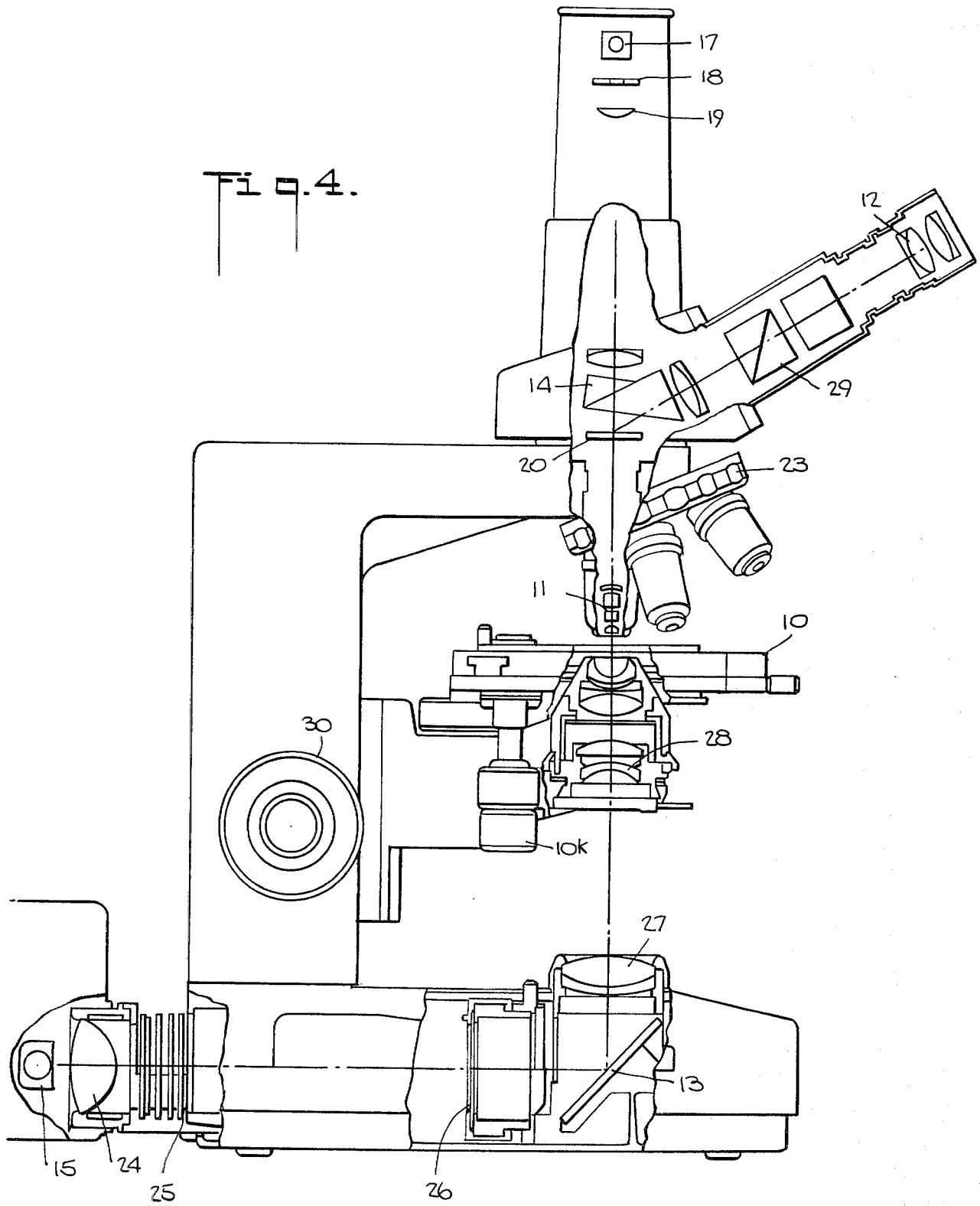
FIG. 4 is an elevational view, partly in section, of an actual system of the type illustrated schematically in FIG. 1.

Referring now to FIG. 4, there is illustrated an actual embodiment of an optical micrometer measuring system in accordance with the invention which incorporates the basic components of the system shown schematically in FIG. 1 as well as prism, lens, and other optical components normally provided in a compound microscope of the trinocular type to provide an image of good quality.

Thus the system includes stage 10 whose lateral position is adjustable by stage-motion control knobs 10K. The magnification of the microscope is selectively determined by a revolving nosepiece or turret 23 to introduce a desired objective 11 into the optical path. The object light source 15, which is a high intensity halogen lamp preferably having a dimmer control, produces light rays which are directed toward inclined mirror 13 through a collector lens 24, a diffuser 25, and a field diaphragm 26. These rays are reflected upwardly by mirror 13 through a field lens 27 and a condenser 28. The rays then pass through the object under test on stage 10 and are projected by objective 11 toward the beam-splitting prism 14, below which is the semi-reflective mirror 20.

From prism 14, the object-modulated rays are directed toward eyepieces 12 through an eyepiece prism 29 for binocular vision. The projector 16 positioned above beam-splitting prism 14 houses the projector light source 17, the aperture mask 18 and the projection lens 19. Source 17 may also be a halogen lamp which is separately controllable. Focusing is effected by coaxial coarse and fine knobs 30. The micrometer associated with the projector is not shown in FIG. 4.

Thus an actual system in accordance with the invention is constituted by a standard, trinocular microscope which is modified to incorporate a pointer image projector and optical elements to superimpose the pointer image on the object image, plus micrometer control of the pointer image position to carry out point-to-point measurements.

Second Embodiment

In the optical arrangement shown in FIG. 5, pointer-image projector 16, instead of being placed directly above beam-splitting prism 14 as in FIGS. 1 and 4, is positioned to one side thereof. The horizontally-directed projector beam is folded toward beam-splitting prism 14 by a semi-reflective mirror 20 which is inclined to reflect the beam projected in horizontal optical path X downwardly on vertical path Y'.

The operation of this embodiment is identical in all other respects to the system shown in FIG. 1, except that now those rays from the object image beam which pass through prism 14 along optical path Y are not wasted, for they go upwardly toward a photo tube 27. With this optical arrangement, a photograph may be taken of the object image.

Geometry of Pointer

We shall now explain, in connection with FIGS. 6A to D, how the diamond shape of the pointer image facilitates precise gauging. In practice, in lieu of a diamond defined by the aperture of the mask in the projector, the pointer shape may be square or rectangular, for in all these geometric forms one has a figure with four sharp corner points. In some applications, circular or annular apertures may be used to advantage, the shape of the aperture being that most appropriate to the object-image measurement.

Referring now to FIG. 6A showing a diamond-shaped pointer P, we shall consider only the opposing sharp corner points A and B. FIG. 6B shows the small region Q at the apex defined by the sides of pointer P which forms corner point A. The intensity of the light in region Q is the sum of the pointer image illumination in this region and the object image illumination superimposed thereon.

In FIG. 6C, pointer image P overlies an object image of a line having a linear edge E. Edge E of the line effectively divides pointer P superimposed thereon into zones 1 and 2, zone 1 being relatively bright since it is outside of the line, and zone 2 being dimmer since it overlies the line. Since region Q is small and is divided between zones 1 and 2, as shown in FIG. 6D the amount of light which reaches the eye from region Q and corner A is decreased sufficiently to make the corner appear rounded rather than sharp.

This rounding effect is first noticed only when edge E is substantially at corner point A. The visual rounding of corner A therefore affords a recognition signal indicative of the fact that the pointer image lies essentially at the edge to be gauged. In this way, there is less ambiguity for repeating the position with regard to the points or edges which represent the extremities of the distance to be gauged, and more precise readings are obtained than with prior optical micrometer techniques. By placing both points A and B on an edge, cosine error which may occur when measuring between parallel lines is eliminated.

Where the object to be gauged is circular rather than one having a straight edge, then, as shown in FIG. 7A, the corner points A and B are oriented so that they coincide with tangential points on the circumference of the circle. As pointed out in connection with FIG. 1, projector 16 is rotatably mounted to make such orientation possible. The motion of the micrometer to shift the pointer is therefore now in the diametrical direction.

To start the measurement, corner point C of the pointer is first set at the edge of the circular object, as shown in FIG. 7B, the resettable readout then being zeroed. Pointer P is then shifted by the micrometer along the diameter of the object until corner point C reaches the diametrically-opposed point of the object, as shown in FIG. 7C. The distance travelled by corner point C is digitally indicated to afford the desired measurement.

As noted previously, the sum of the pointer and object image intensities at the real image plane is the final intensity observed by the operator. Since the intensities of the object and projector light sources are separately controllable, the final intensity may be chosen for optimal contrast. One may use light sources of different color and a variety of effects may be created by color mixing and induction. Chromatic parallax can be controlled by proper choice of illumination colors.

The pointer configuration need not be square, rectangular or diamond-shaped, and in practice the pointer may be defined by a cluster of circular or rectangular forms, the pointer configuration selected being determined by the characters of the object to be gauged.

While there has been shown and described a preferred embodiment of an optical micrometer measuring system in accordance with the invention, it will be appreciated that many changes and modifications may be made therein without, however, departing from the essential spirit thereof.

For example, instead of having the micrometer shift the pointer image by shifting the apertured mask in the projector, one may interpose between an apertured mask and a projection lens at a fixed position with respect to an optical axis in the projector, a single prism which is shiftable along the optical axis by the micrometer. This motion causes a lateral displacement of the pointer image. Alternatively, one may use in place of this single prism, a variable optical wedge formed by a pair of complementary prisms which are caused by the micrometer to rotate concurrently, but in opposite directions, about the optical axis, thereby varying the power of the wedge and laterally shifting the pointer image. Still another method by which one can effect a lateral displacement of the pointer image is to tilt the position of a plano-parallel glass plate interposed between the apertured mask and the projection lens, the variable tilt being effected by the micrometer to cause a lateral translation of the pointer image.

I claim:

1. An optical micrometer measuring system adapted to gauge minute distances between spaced points on an object under test, said system comprising:
   A. a stage for supporting the object;
   B. an objective disposed above said stage and having a vertical optical axis;
   C. a beam-splitting element disposed above said objective and having an interface inclined relative to said vertical axis;

D. a semi-reflective mirror interposed between said objective and said element;

E. means including an object light source to illuminate said object to produce object-modulated rays which are directed by said objective upwardly through said mirror onto said element interface, the rays being deflected by said interface toward a main optical path to create in the real image plane of said objective an aerial object image;

F. an eyepiece disposed in said main path to provide an operator with a magnified view of the object image;

G. a pointer image projector including a projector light source whose rays are masked by a mask component having a shaped aperture which defines the geometry of the pointer and are projected by a projection lens component to produce pointer-modulated rays;

H. means directing said pointer-modulated rays from the projector downwardly through the element toward the mirror to be reflected upwardly thereby to impinge on the interface and to be deflected thereby along the main optical path toward the real image plane to produce a pointer image thereon which is superimposed over the object image; and I. micrometer means operatively coupled to said projector to laterally displace the pointer image to transverse the distance between any two spaced points on the object image and to indicate said distance.

2. A system as set forth in claim 1, wherein said projector is rotatable to assume any desired angular position normal to the optical axis of the projector to orient the pointer image with respect to the object image.

3. A system as set forth in claim 1, wherein said aperture in the mask has a diamond shape.

4. A system as set forth in claim 1, wherein said aperture in the mask has a rectangular shape.

5. A system as set forth in claim 1, wherein said micrometer means includes a mechanical micrometer whose screw is operatively coupled to the mask component of said projector to effect displacement of said pointer image.

6. A system as set forth in claim 5, wherein said mechanical micrometer is coupled to an analog-to-digital converter having a digital readout to provide a reading of the distance between the points gauged by the system.

7. A system as set forth in claim 1, wherein said projector is disposed above said element and has a vertical optical axis which is parallel to the vertical axis of the objective whereby said pointer-modulated rays are directed downwardly toward said mirror.

8. A system as set forth in claim 1, wherein said projector is disposed to one side of said element and has a horizontal optical axis, further including an inclined semireflective planar mirror interposed between a phototube placed above said element and said element, said mirror directing the pointer-modulated rays from the projector downwardly toward said element, rays from said object image being directed through said element to said phototube.

9. A system as set forth in claim 1, further including means to separately control said object light source and said projector light source to adjust the contrast between the object image and the pointer image.

10. A system as set forth in claim 1, wherein said object is transparent and said means to illuminate said object includes a reflector to direct light from said object light source through said stage-supported object.

11. A system as set forth in claim 10, wherein said transparent object is a film having an integrated circuit pattern with lines therein whose width and spacing are gauged by said system.

12. A system as set forth in claim 10, wherein said object light source is a halogen lamp whose rays are passed through a diffuser.

13. A system as set forth in claim 1, further including a revolving nose piece having a series of objectives thereon providing different magnifying powers, said piece being positionable to insert a selected objective above said stage.

14. A system as set forth in claim 1, wherein said element is a prism.

* * * * *